(12) United States Patent
Leskinen

(10) Patent No.: US 8,387,648 B2
(45) Date of Patent: Mar. 5, 2013

(54) DEVICE FOR DIVIDING A FLOW EQUALLY BETWEEN TWO OR MORE OBJECTS

(76) Inventor: Pekka Leskinen, Iisalmi (FI)

( * ) Notice: Subject to any disclaimer, the term of this patent is extended or adjusted under 35 U.S.C. 154(b) by 70 days.

(21) Appl. No.: 12/812,492

(22) PCT Filed: Feb. 3, 2009

(86) PCT No.: PCT/FI2009/050087
§ 371 (c)(1),
(2), (4) Date: Jul. 12, 2010

(87) PCT Pub. No.: WO2009/098352
PCT Pub. Date: Aug. 13, 2009

(65) Prior Publication Data
US 2011/0036416 A1 Feb. 17, 2011

(30) Foreign Application Priority Data
Feb. 7, 2008 (FI) .................................. 20080086

(51) Int. Cl.
*G05D 11/00* (2006.01)
(52) U.S. Cl. .......................................... 137/99; 418/200

(58) Field of Classification Search .................. 137/101, 137/98, 99; 418/199, 200
See application file for complete search history.

(56) References Cited

U.S. PATENT DOCUMENTS

| | | | | |
|---|---|---|---|---|
| 2,291,578 A | * | 7/1942 | Johnson | 91/532 |
| 2,533,320 A | * | 12/1950 | Hull et al. | 418/183 |
| 3,314,369 A | | 4/1967 | Yonei ei al. | |
| 5,364,249 A | * | 11/1994 | Link | 418/191 |
| 5,725,362 A | * | 3/1998 | Zepp et al. | 417/366 |
| 2002/0166586 A1 | | 11/2002 | Flavelle | |

FOREIGN PATENT DOCUMENTS
EP 0593125 4/1994

* cited by examiner

*Primary Examiner* — John Rivell
*Assistant Examiner* — Time Aigbe
(74) *Attorney, Agent, or Firm* — Skinner and Associates

(57) ABSTRACT

Device for equalizing a liquid flow in a flow taking place through a device formed of at least two liquid-moving elements located on shafts (10, 11), in which case the flow channel is formed of a hollow shaft (10), a flow opening (16) in its wall and a flow groove (14) for leading the liquid to the liquid-moving elements. The liquid-moving element (e.g., 13) is located on the shaft (10), in a rotating manner that regulates the size of the flow opening (16).

9 Claims, 3 Drawing Sheets

DEVICE FOR DIVIDING A FLOW EQUALLY BETWEEN TWO OR MORE OBJECTS

CROSS REFERENCE TO RELATED APPLICATIONS, IF ANY

Not applicable.

STATEMENT REGARDING FEDERALLY SPONSORED RESEARCH OR DEVELOPMENT

Not applicable.

BACKGROUND OF THE INVENTION

Field of the Invention

The present invention relates to a device for dividing a flow equally between two or more objects. More specifically it relates to dividing a liquid flow equally between a desired number of objects.

BRIEF SUMMARY OF THE INVENTION

Numerous objects are known from the field of technology, in which the equivalence of liquid flows is of great importance. Because the factors affecting a flow are numerous, pressure being one of the greatest, a simple apparatus for keeping flows equal does not really exist. Of course, there are precision apparatuses for the regulation of specific, usually rather small flows, but precision devices tend to be very expensive, both to purchase and also to service and repair.

On the other hand, in the case of larger flows, as is the case in many hydraulic objects, precision engineered devices are in no way practicable.

There are devices on the market, which are based in principle on a hydraulic-pump structures, in which pairs of spur gears located on different shafts perform the dosing of liquid by transporting the liquid in chambers formed by the gaps between the gears and the tightly fitting housings. The gears are fitted to the shafts in a fixed manner, using, for example, keys or toothing. The drawback with this solution is that there is no certainty as to the equivalence of the flows, the flows from different pairs of gears can vary, even though only to a limited extent.

Solutions of the type described above are disclosed in, for example, European patent application 0593125, US patent publication 6857441, and FR patent application 2504211.

The present invention is intended to create an apparatus, which has a very simple construction, which can be made from conventional raw materials using conventional tools, and in which, in addition, a limited number of existing ready-made components can be used in a new way. The intention is specifically to create an apparatus, in which the flow from the various spur-gear pairs can be made as precisely equal as possible.

The aforementioned and other benefits and advantages of the present invention are achieved in the manner described as characteristic in the accompanying Claims.

Briefly, it can be stated as a general feature of the apparatus according to the invention that, in addition, to the aforementioned benefits and advantages, the apparatus according to the invention is also self-regulating, so that the desired equal flow is achieved automatically, without making any kind of manual correction operations, or without having to arrange separate measurement of the flows.

BRIEF DESCRIPTION OF THE SEVERAL VIEWS OF THE DRAWING

In the following, the invention is described in greater detail with reference to the accompanying patent drawings, which show one well-regarded embodiment of the invention.

DETAILED DESCRIPTION

Figure 1:
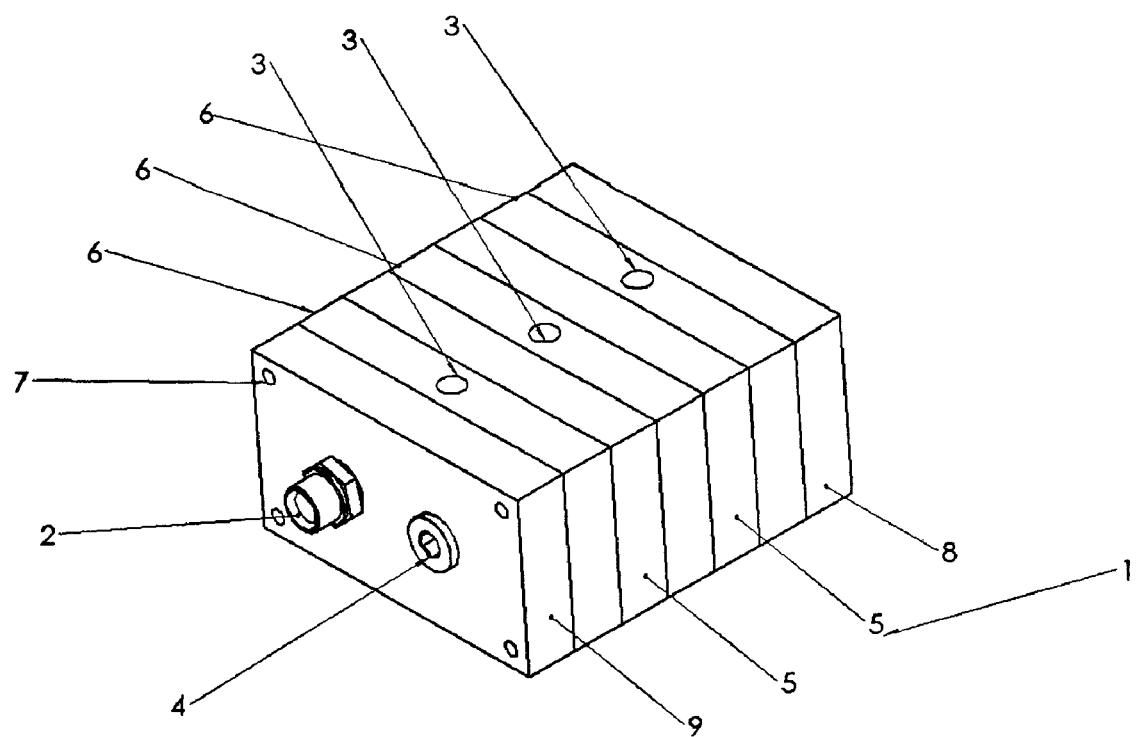
FIG. 1 shows the apparatus according to the invention assembled and as seen without the hoses or similar intended to bring and forward the liquid flow.

As stated, the apparatus according to the invention can, according to one embodiment, appear more or less like the box-like piece 1. The liquid flow, which it is intended to regulate, is brought to the device 1 through a connector 2. It is obvious that the hose or pipe, which is not drawn in the figure, is connected to the connector 2.

The device is in three parts, for which reasons there are also three outflow openings 3. The liquid flowing out is naturally guided forward to the desired object through suitable hoses/pipes, which are attached to the openings 3 in a liquid-tight manner.

As will be described later, the device includes two shafts, one of which is located behind the plug marked with the reference number 4, the other being connected to the connector 2.

In addition to the above, the device includes parts, or portions 5 and 6, which are located to alternate each other in a position between the end parts 8 and 9. The package is assembled with the aid of suitable attachments, such as screws 7 running through the device. The threaded parts of the screws can, for example, be secured to the portion 8 shown as the last one in FIG. 1, after they have passed through all the other parts/portions. Of course, there are also other ways to assemble the device, as will be well known by persons acquainted with technology.

Figure 2:
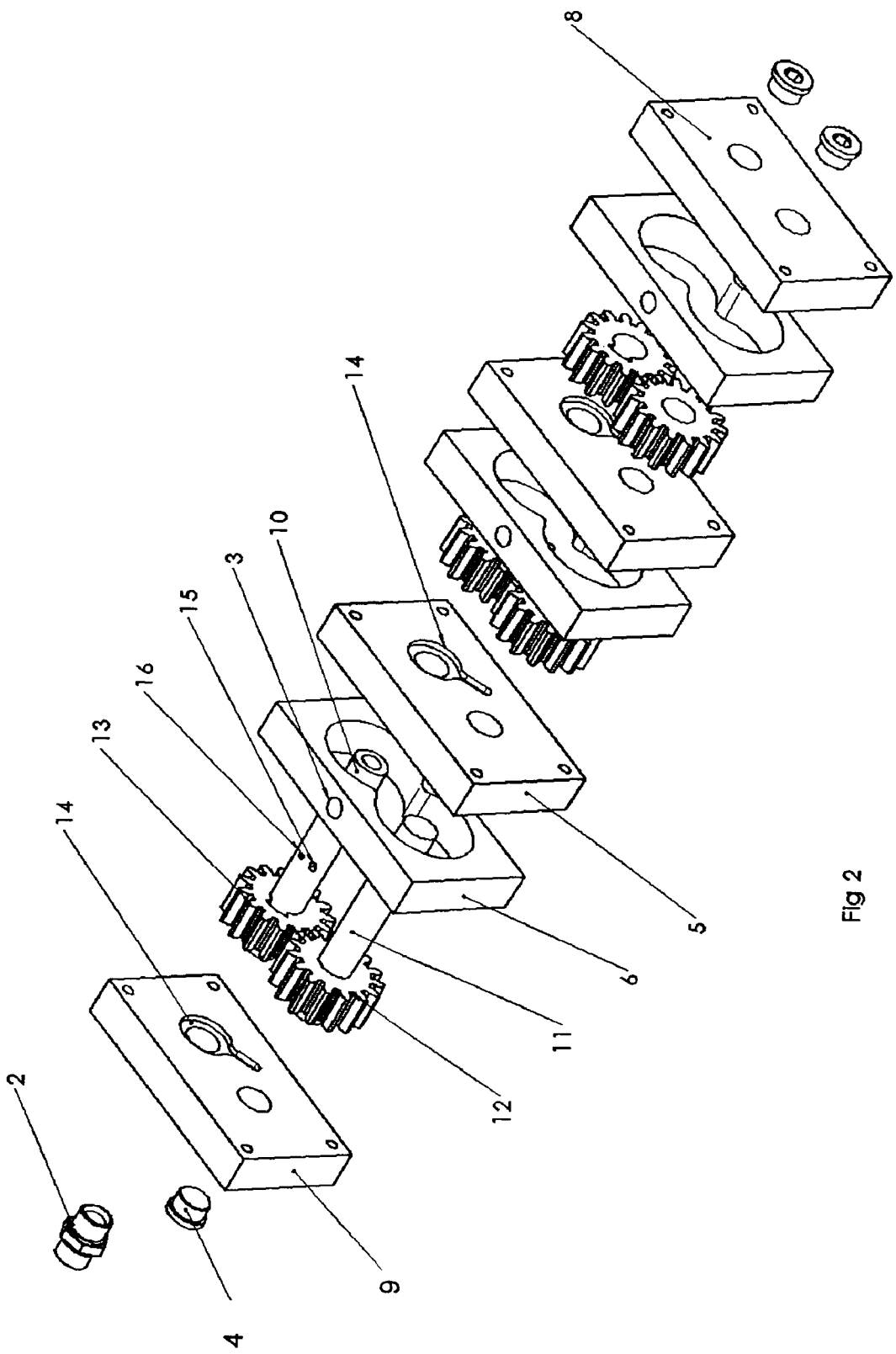
FIG. 2 shows an exploded view of the device of FIG. 1.

FIG. 2 shows the parts of the device according to the invention separately in an exploded view.

The shafts are marked with the reference numbers 10 and 11. The shaft 11 is a conventional rod-like shaft, the purpose of which is to support the desired number of spur gears 12, which rotate freely on the shaft. The length of the shaft 11 is such that it extends from one edge to the other of the assembled device 1, being suitably supported on the ends 8 and 9.

The shaft 10, on the other hand, is hollow and the liquid is brought to the hollow interior of the shaft through the connector 2.

A number of gears 13 corresponding to the number of gears 12 is supported on the shaft 10. The dimensions and positions of the gears are such that they tightly interlock with each other and thus rotate in different directions for the same distance dependently on each other, when seen in the direction of the shaft. The gears 12 and 13 are also located in the gear chambers formed by the intermediate pieces 6, in a tightly fitted manner. The dimension of the gears in the lateral direction corresponds to the thickness of the intermediate pieces, so that, when the device is assembled, a chamber that is essentially closed and tight, delimited at the sides by the intermediate pieces 6, in which the gears 12 and 13 form pairs, is formed.

As stated, the liquid is brought to the device through the hollow shaft 11 and is intended to travel in the gaps between the teeth of the gears 12 and 13, which are limited, on the other hand, by the walls of the chamber. In fact, in the situation shown in FIG. 2 travels from upwards from below and travels upwards in the tooth gaps formed by both rotating gears and the adjacent chamber wall, and through them from the outlet opening 3 of the upper part to the object.

The movement of the liquid from the shaft 10 to the tooth gaps of the gears is achieved in such a way that a groove 14, from which the liquid discharges to the tooth gaps of the gears and through them onwards, is made in the end piece 9 and the intermediate piece 5 adjacent to each pair of additional teeth.

Figure 3:
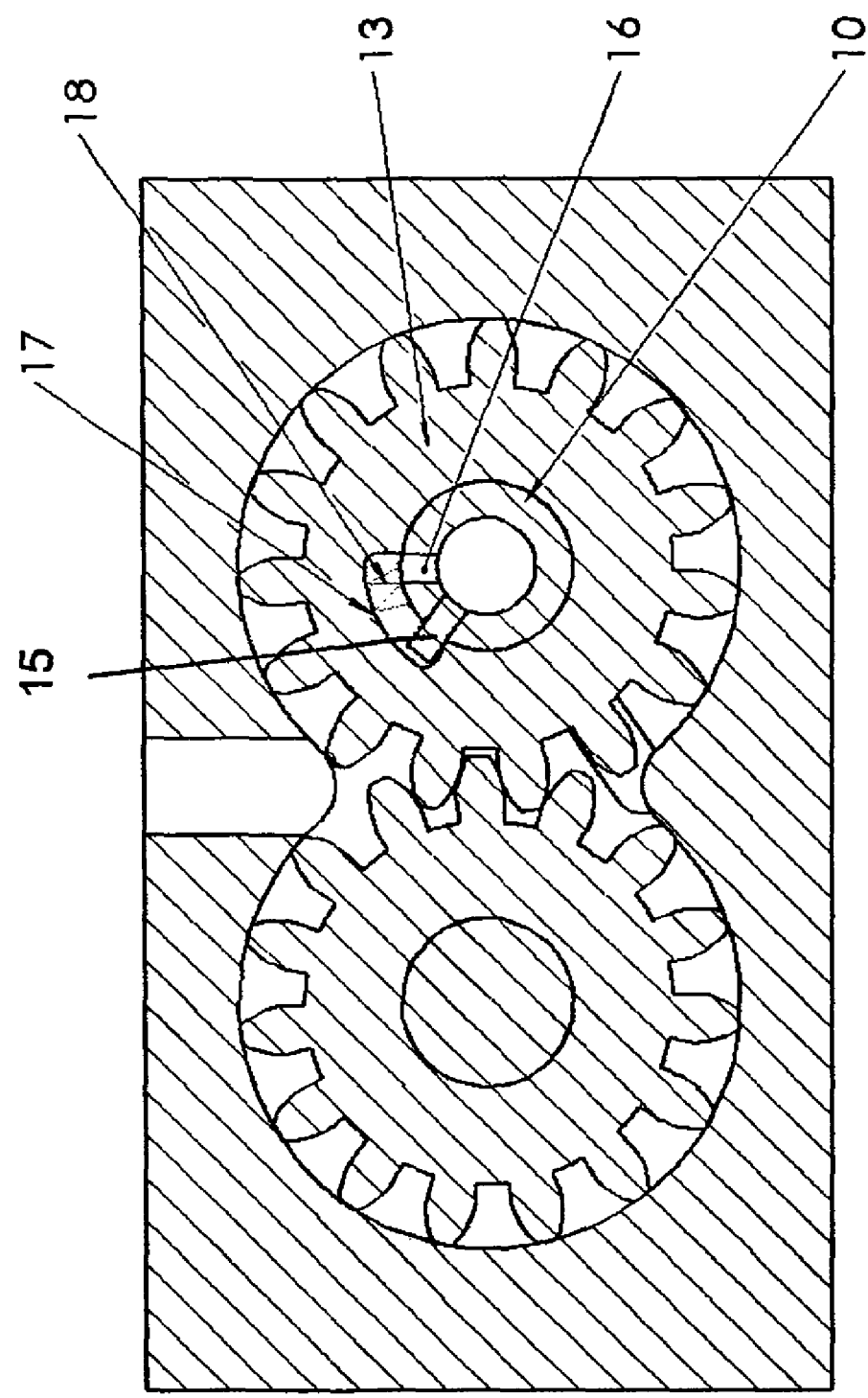
FIG. 3 shows a cross-section of a spur gear equipped with the regulating system according to the invention.

The gear 13 and the shaft 10 are intended to rotate together, but their mutual position is, however, variable to a limited extent. FIG. 3 shows a cross-section of a gear 13. Material has been removed from the cylindrical surface facing the shaft, in such a way that at this point between the shaft 10 and the gear a channel 17 is formed, through which the liquid flow in the shaft 10 coming through the flow hole 16 can move onward through the groove 14 and the gears 12 and 13.

Reference number 15 is used to mark a pin-like element, which is located in the shaft 10 next to the channel 17. The gear 13 can thus rotate relative to the shaft 10 for the distance that is limited by the side walls of the channel 17, when the pin 15 strikes a wall. A spring 18 seeks to hold the gear 13 and the shaft 10 in a position, in which the flow hole is open.

What happens in practice, if more liquid starts to come through one gear unit than through the others? In such a case, the gear 13 will tend to rotate faster than the gears of the neighbouring units, as a result of which the flow opening 16 will diminish as the mutual position of the gear 13 and the shaft 10 changes, and this will naturally be followed by a reduction in the flow and the situation stabilizing at the desired level. The regulation is thus fully automatic and self-regulating. The amount of liquid exiting from each of the flow openings 3 of the entire device will equalize. The liquid flow always equalizes gradually according to the gear pair feeding the liquid.

As described, the invention is quite simple and economical to implement. The methods that have been used up until now have not been able to regulate with sufficient accuracy and speed, and have also been complicated and expensive.

At the same time, the present invention resolves some drawbacks that have plagued previous constructions, for example, leaks. Compared to previous known solutions, in which the gears are installed in a fixed manner on the shafts, in this embodiment the main pressure does not act on the area coming over the gears, but instead on the regulating channel 16.

The invention can be varied in many ways, while still remaining with the scope of the protection of the basic idea of the invention and the accompanying claims. Thus, for example, the limiter pin 15 and spring 18 belonging to the regulating mechanism can be located as their own unit, separate from the channels 16 and 17. In the same way, the location of the channel 17 can, if necessary, be in the shaft and not in the gear, in which case the limiter pin 15 will be located on the gear side.

Yet another advantage, which is significant in terms of manufacturing technique and price, is that the gears 12 and 13 can be made from materials other than metal. Examples of other materials that can be referred to are plastic, or even rubber. The device will become lighter and the machining and generally the manufacture of its components will be simplified.

Reference is made above solely to gear apparatuses, but the invention can also be applied to, for example, to vane pumps, which are used in the same way as gear pumps, but inversely. In a vane pump, there is generally one shaft and an element, a wheel equipped with vanes, for moving the liquid, installed eccentrically on it, which rotates in a housing, which is round, thus moving the liquid mass onward.

It should further be stated that, if the flow in the devices described takes place in the opposite direction, the regulation will operate in the structure as such, requiring small alterations.

The invention claimed is:

1. A device for equalizing a liquid flow comprising at least two liquid-moving elements (12 and 13) located on shafts (10, 11), in which case a flow channel is formed of a hollow shaft (10), a flow opening (16) in a wall of the hollow shaft and a flow groove (14) is formed in a wall of a chamber for leading the liquid to the liquid-moving elements, characterized in that one of the liquid-moving elements (13) is located on the shaft (10), in a rotating, but not fixed manner that automatically regulates the size of the flow opening (16) depending upon the rate of liquid flow.

2. The device according to claim 1, characterized in that the liquid-moving elements consist of two spur gears (12, 13), which are located on two different shafts (10, 11) and rotate in a housing.

3. The device according to claim 1, characterized in that one of the liquid-moving elements is in the form of a wheel rotating in a housing and equipped with vanes.

4. The device according to claim 1, characterized in that the limited, non-fixed rotation between one of the liquid moving elements (13) and the hollow shaft (10) is achieved with the aid of a limiter pin (15) moving/limiting within the limits permitted by a cutout (17) in one of the liquid moving elements.

5. The device according to claim 4, characterized in that the cutout (17) is also equipped with a spring (18) opposing the limited, non-fixed rotation.

6. The device according to any of the above claims, characterized in that there are at least two consecutive units, each unit including a pair of liquid-moving elements located on the respective shafts with a flow opening in the hollow shaft and one of the liquid moving elements of the pair of liquid moving elements which is located on the hollow shaft rotates, but not being fixed, to regulate the size of the flow opening, causing a liquid flow, so that the regulation of the liquid flow between the units takes place automatically, according to the unit with the smallest flow.

7. The device according to claim 4, characterized in that the cutout (17) is intended to transport the liquid flow to the flow groove (14) in the wall of the chamber (9).

8. The device according to claim 4, characterized in that the liquid flow is intended to be limited by moving the edge of the cutout (17) on top of the flow opening (16).

9. A device for equalizing a liquid flow comprising at least two liquid-moving elements (12 and 13) located on shafts (10, 11), in which case a flow channel is formed of a hollow shaft (10), a flow opening (16) in a wall of the hollow shaft and a flow groove (14) is formed in a wall of a chamber for leading the liquid to the liquid-moving elements, characterized in that one of the liquid-moving elements (13) is located on the hollow shaft (10), in a rotating manner that regulates the size of the flow opening (16), and further characterized in that limited rotation between one of the liquid moving elements (13) and the hollow shaft (10) is achieved with the aid of a limiter pin (15) moving/limiting within the limits permitted by a cutout (17) in the element.

* * * * *